United States Patent
Almi et al.

(10) Patent No.: US 7,087,886 B2
(45) Date of Patent: Aug. 8, 2006

(54) METHOD AND A SYSTEM FOR MULTI-PIXEL RANGING OF A SCENE

(75) Inventors: Lucien Almi, Rehovot (IL); Moshe Sarid, Reut (IL)

(73) Assignee: El-Op Electro-Optics Industries Ltd., Rehovot (IL)

( * ) Notice: Subject to any disclaimer, the term of this patent is extended or adjusted under 35 U.S.C. 154(b) by 464 days.

(21) Appl. No.: 10/404,040

(22) Filed: Apr. 2, 2003

(65) Prior Publication Data

US 2003/0209649 A1   Nov. 13, 2003

Related U.S. Application Data

(63) Continuation-in-part of application No. 09/852,907, filed on May 9, 2001, now abandoned.

(51) Int. Cl.
*H01J 5/16* (2006.01)
*G01C 3/08* (2006.01)

(52) U.S. Cl. ............... 250/227.12; 250/227.26; 385/115

(58) Field of Classification Search ........... 250/227.12, 250/227.26; 359/140; 385/49, 88, 100, 385/115, 116
See application file for complete search history.

(56) References Cited

U.S. PATENT DOCUMENTS

| | | | |
|---|---|---|---|
| 3,991,318 A | | 11/1976 | Duguay |
| 5,025,148 A | * | 6/1991 | Poisel et al. ........... 250/227.12 |
| 5,056,914 A | * | 10/1991 | Kollodge .................. 356/5.05 |
| 5,682,229 A | | 10/1997 | Wangler |
| 5,859,697 A | | 1/1999 | Lopez et al. |

FOREIGN PATENT DOCUMENTS

| | | |
|---|---|---|
| EP | 0656724 | 6/1995 |
| JP | 63-090279 | 4/1988 |

* cited by examiner

*Primary Examiner*—Stephone B. Allen
(74) *Attorney, Agent, or Firm*—Connolly Bove Lodge & Butz LLP

(57) ABSTRACT

There is provided a method for non-scanning multi-pixel ranging of a scene, comprising the steps of providing a single detector/receiver associated with a time-delay arrangement, producing a time-arrival distribution of pulse echoes of at least part of a remote scene in a defined ranging plane, receiving said distribution as produced on the ranging plane and conveying it, echo pulse by echo pulse through a plurality of echo pulse conveying means to the single detector/receiver, while introducing a time delay, whereby the echo pulses arrive at the single detector/receiver in a sequential order, and using an electronic logic to reconstruct the time-arrival distribution from the time-delayed echo pulses received by the detector/receiver. Systems for ranging of a scene are also provided.

29 Claims, 6 Drawing Sheets

METHOD AND A SYSTEM FOR MULTI-PIXEL RANGING OF A SCENE

FIELD OF THE INVENTION

The present invention relates to a method and a system for multi-pixel ranging of a scene, using a single detector/receiver associated with a time-delay arrangement and is specifically concerned with such methods and systems in which the time delay is constituted by multi-length optic fibers.

BACKGROUND OF THE INVENTION

As far as passive, two-dimensional scanning is concerned, especially in the visible region of the spectrum, present-day technology has provided a satisfactory answer in the form of various detector arrays and matrices, such as, e.g., CCD devices. The problem becomes more complex when the scene to be scanned requires active illumination. Some of the known devices use the direct scanning solution, in which the illuminator beam is passed through a scanning device and impinges upon the scene. The reflected light, after being steered by the same scanner, produces an image on a detector. The moving parts and the required synchronization constitute serious drawbacks.

At the other end of the spectrum of scanning devices is the detector array. The light source illuminates the entire scene, which is "seen" in full by an array of detectors.

The practical value of these solutions depends on various parameters, associated partly with the device itself and partly with the scene and the atmospheric conditions, in conjunction with the demands of the overall system. Sometimes a hybrid solution is indicated, in which a detector array having a partial field of view only, and an accordingly shaped illuminator beam, partially scan the scene. Such complex solutions should be selected when three-dimensional profiling imaging is required, especially in the infrared region of the spectrum, and more particularly when eye-safe illumination is to be used.

The heart of advanced, modern, non-eye-safe three-dimensional imagers is the high-powered laser, illuminating the scene or part of it, and an array of avalanche photodiodes (APDs) with the associated range-measuring and image-creating electronics. The most serious disadvantage of these devices is the demand for arrays of detectors that must be both sensitive and have a very rapid response to the short pulses of the laser illuminators.

It is these illuminators and the corresponding detectors that are used in military range finders. The light radiated is not eye-safe and the APD detectors with their range-imaging electronics are very complex and expensive, in comparison with the conventional detector arrays used in video cameras.

Lately, due to the growing demand for eye-safe devices and due to the latest developments and availability of solid-state, eye-safe laser illuminators, a similar demand is felt for appropriate APD detector arrays for eye-safe, three-dimensional profiling imaging. This means a low-cost array, or at least a sub-array, of APDs, sensitive to the wavelength of eye-safe laser light (1.5 to 1.6 µm). Until recently, no such array has been available. Detectors to be used with laser range finders operating at such a wavelength are too difficult to produce as multi-element arrays. Despite efforts reported in the literature, so far only partial success has been achieved in developing a prototype of such an APD having a quasi-array of a few elements, which suffers from enormous electronic complexity and is very expensive, making it impractical for world market demands.

U.S. Pat. No. 3,991,318 (Duguay) discloses an optical detection system utilizing an organ array of optical fibers, each cut to different lengths, one end of each of the fibers being arranged in a grid under a planar writing surface. Detection means are coupled to the other end of each of the fibers. The utilization of a detector for each of the fibers renders the system cumbersome and costly.

DISCLOSURE OF THE INVENTION

In a commonly used multi-channel detector/receiver, based on a plurality of optical fibers directed to the field of view, the time in which the pulse echo is received, depends on the length of each fiber. Obviously, in systems in which the maximal distance to be ranged is above several hundred meters, and typically the minimum of the maximal distance is one kilometer, it is required to provide a big gap between different lengths of the fibers. The overall length of the fibers, depending on the number of fibers or channels of a specific detector/receiver will be very large, rendering such a system impractical. For example: a receiver with 8 channels i.e., 8 fibers, wherein the maximal distance to be ranged is 3 kilometers, the length of fiber between one fiber to the other will be 3 kilometers Therefore, the overall length of the fibers is 84 kilometers and the longest fiber will be 21 kilometers. This solution may sometimes have substantial limitations, especially due to the attenuation of the signal, which is obtained in the longest fiber, which attenuation can reach even 20 dB.

In systems designed to scan targets or scenes having a limited depth, it will make sense to shorten the length of the fibers. The term "depth" as used herein is meant to define the distance from the closest to the furthest point of the viewed target or scene. Such a design can be obtained if only the depth of the scanned scene will be considered, namely, the maximal depth of the scanned scene and not the maximal distance from the system to the scene. Such a design has the advantage of reducing weight, cost and volume of the system, and especially, the avoidance of the drastic attenuation of the signal in the longest fiber. Distance between fibers can be expressed by the formula: Distance=depth of scene/1.5, wherein 1.5 is the relative speed of light.

As an example, in a system having 8 fibers and a depth of a scene of 30 meters, the distance between one fiber to the other will be 30×2/1.5=40 meters, so that the longest fiber will have a maximal length of 280 meters only, exhibiting an attenuation which is less than 1 dB and an overall length of fibers of 1,120 meters only.

Despite the fact that the above-described solution seems to be a satisfactory solution, it turned out that it encompasses several problems. The first and main problem is the situation of a plurality of targets in a field of view, namely, a situation wherein more than one returning pulse echo from a target exists in the defined scene. In such a situation, the system cannot distinguish between the many returning pulse echoes and is incapable of indicating whether they return through a certain fiber. Therefore, in such a case, the system will become confused and provide wrong measurements of distances in each of the fibers. The second problem is the lack of an echo pulse in one of the fibers. In a situation where there is no echo pulse from the target in one of the fibers, due to a "void" in the target, or due to a very weak echo pulse which is below the preset reception threshold, the system is not capable of identifying the missing echo pulse and assigning it to a certain fiber. In such a situation, the system will report "no range" to all fibers, despite the fact that only one fiber suffered from lack of range. The last problem is time of recovery of the detector/receiver. In cases where there exists a weak echo pulse in one of the fibers, as compared with the echo pulse of an adjacent one which is much stronger, harm may be caused to the sensitivity of the detector/receiver, so that the weak echo pulse will not be detectable due to the preset reception threshold. This problem is even amplified when the echo pulse from a certain fiber emanates from the front closer part of the target, while an earlier strong echo pulse stems from the more distant part of the target. In the "eyes" of the detector/receiver, the two echoes will, time-wise, be very close one to the other.

It is therefore a broad object of the present invention to ameliorate the problems and disadvantages of the above-described methods and systems for the ranging of a scene.

It is a further object of the present invention to provide a method and system for multi-pixel, ranging of a scene using a single detector/receiver associated with time-delay arrangement, based on multi-length optical fibers.

According to the present invention, the above objects are achieved by a method for non-scanning multi-pixel ranging of a scene, comprising the steps of providing a single detector associated with a time-delay arrangement; producing a time-arrival distribution of pulse echoes of at least part of a remote scene in a defined ranging plane; receiving said distribution as produced on said ranging plane and conveying it, echo pulse by echo pulse through a plurality of echo pulse conveying means to a single detector while introducing a time delay, whereby said echo pulses arrive at said single detector in a sequential order, and using an electronic logic to reconstruct said time-arrival distribution from said time-delayed echo pulses received by said detector.

The present invention also provides a method for multi-pixel ranging of a scene, comprising the steps of: providing a single detector/receiver associated with a time-delay arrangement; producing a delayed time-arrival distribution of pulse echoes of at least part of a remote scene of a predetermined depth spanning between a closest point and a furthest point from said detector/receiver; receiving said distribution as produced on said ranging plane and conveying it, echo pulse by echo pulse through a plurality of time-ordered echo pulse conveying means to a single detector, while introducing an additional time delay between said conveying means, which is equal to, or greater than, the time delay between said closest and furthest points of the scene, whereby said echo pulses arrive at said single detector/receiver in a sequential order, and using an electronic logic to reconstruct said time-arrival distribution from said time-delayed echo pulses received by said detector/receiver.

The invention still further provides a system for ranging of a scene, comprising optical means to create a replicate of a remote scene range distribution on a defined ranging plane; time-ordered echo pulses conveying means receiving said echo pulses from said ranging plane, each of said conveying means constituting an optical path of different length, introducing time delays; a single detector/receiver for detecting the echo pulses time of arrival in a sequential order produced by said time delays, and an electronic logic fed by said single detector to reconstruct said scene by the ranged distribution of echo pulses.

The invention yet further provides a system for ranging of a scene, comprising: optical means for forming a replicate of a remote scene, having a predetermined depth spanning between a closest point and furthest point of said scene, on a defined ranging plane; time-ordered echo pulses conveying means receiving said echo pulses from said ranging plane, each of said conveying means constituting an optical path of different length, for introducing a time delay between two adjacent conveying means which is equal to, or greater than, the time delay between the closest and furthest point of said scene; a single detector/receiver for detecting the echo pulses time of arrival in a sequential order produced by said time delays, and an electronic logic fed by said single detector/receiver to reconstruct said scene by the ranged distribution of echo pulses.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

Figure 1:
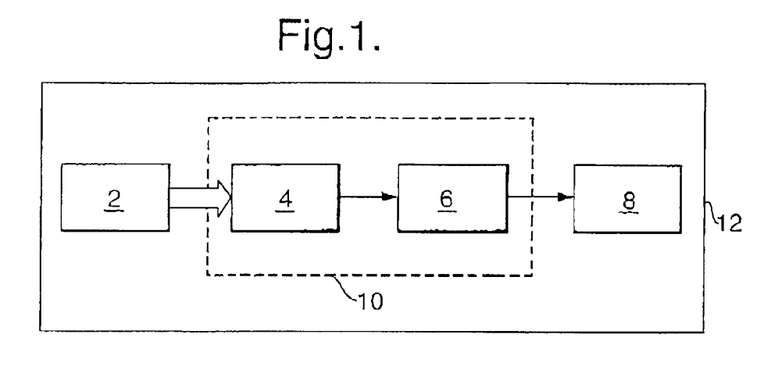
FIG. 1 is a block diagram of the system according to the present invention.
Figure 2:
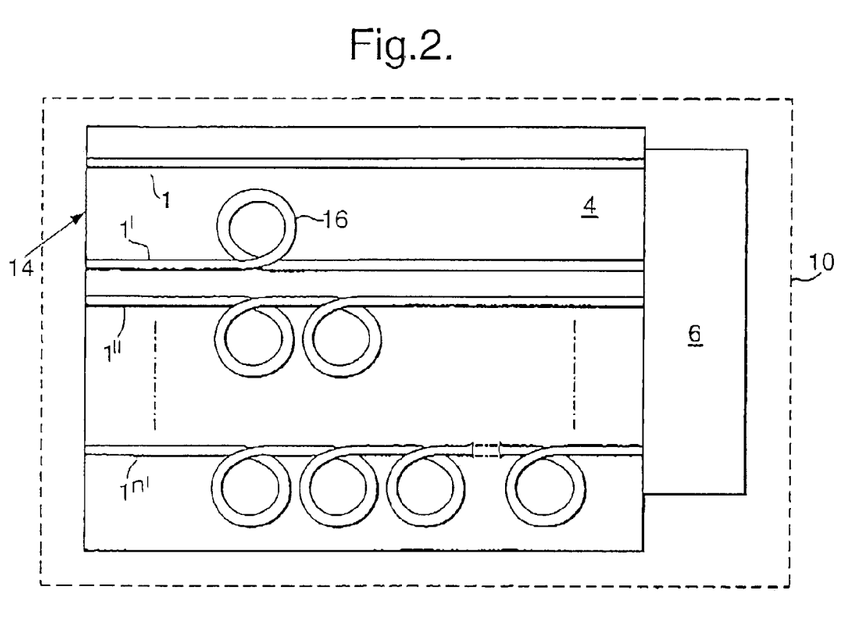
FIG. 2 is an enlarged, more detailed, schematic view of the fiber/detector unit of the system of FIG. 1.

Referring now to the drawings, there is seen in FIGS. 1 and 2 a block diagram of the system of the present invention, comprising imaging means 2 such as, e.g., a lens, a bundle 4 of optical fibers 1 to 1''', a single detector/receiver 6 and signal addressing logic 8. The fiber-detector sub-unit is denoted by numeral 10, and the entire system by numeral 12. In FIG. 2 there are seen details of the sub-unit 10 of FIG. 1 also illustrating the working principle of the invention, according to which the whole array of detectors required by conventional range imagers is replaced by a single detector/receiver 6.

It is assumed that an illuminator (not shown) illuminates the scene by appropriate pulses of light and that a multi-pixel optical image of the scene is produced by imaging means in the ranging plane 14 in which the front end of the fiber bundle 4 is located. The plane 14 collects the echoes of the illuminator light from the various parts of the scene, each having its own range and conveys it to detector/receiver 6. The stratagem, provided by the invention, whereby each range pixel of an instantaneous, multi-range pixel scene is channeled into a single detector/receiver while still retaining its individuality, is clearly perceived from FIG. 2 and consists in introducing a time delay between the arrival at the single detector/receiver of each of the fiber-transmitted range pixels. This is realized by providing each of the fibers of bundle 4 with a different optical path length, i.e., a different physical length, as clearly seen in FIG. 2. There is shown a fiber bundle 4 having n fibers extending between ranging plane 14 and the single detector/receiver 6. It is seen that each fiber 1 is longer than its neighbor by a length symbolized by loop 16 and predetermined in accordance with the pixel position and the signal addressing logic 8 of system 12. Given the limited range imager space available and weight permissible on the one hand, and the velocity of light on the other, it is obvious that these delays are of an order of magnitude of nanoseconds, but are still within the power of resolution of logic 8.

In this way, the sequential, time-ordered electronic pulses outputting from the single detector/receiver 6 and fed to the signal addressing logic 8 will each carry its own range and artificially added time-delay address, to be individually recognized and processed by the signal addressing logic 8.

Figure 3:
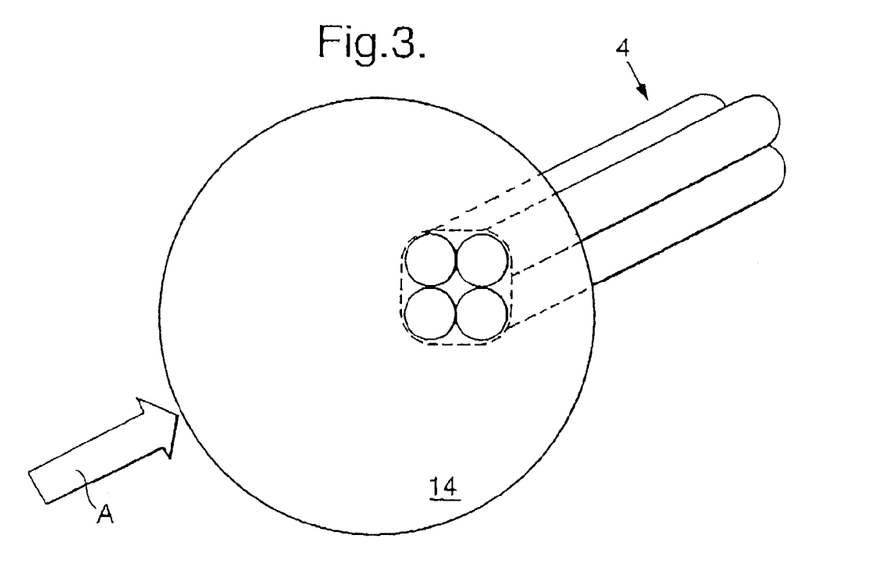
FIG. 3 represents a two-dimensional scanning configuration.

The present invention allows for several fiber bundle configurations, depending on the light distribution created in ranging plane 14, which, in turn, is defined by the overall illuminator-detection system chosen. In principle, there are three configurations available: a configuration requiring two-dimensional scanning (FIG. 3), a configuration allowing one-dimensional scanning (FIG. 4) and a non-scanning configuration (FIG. 5).

Figure 4:
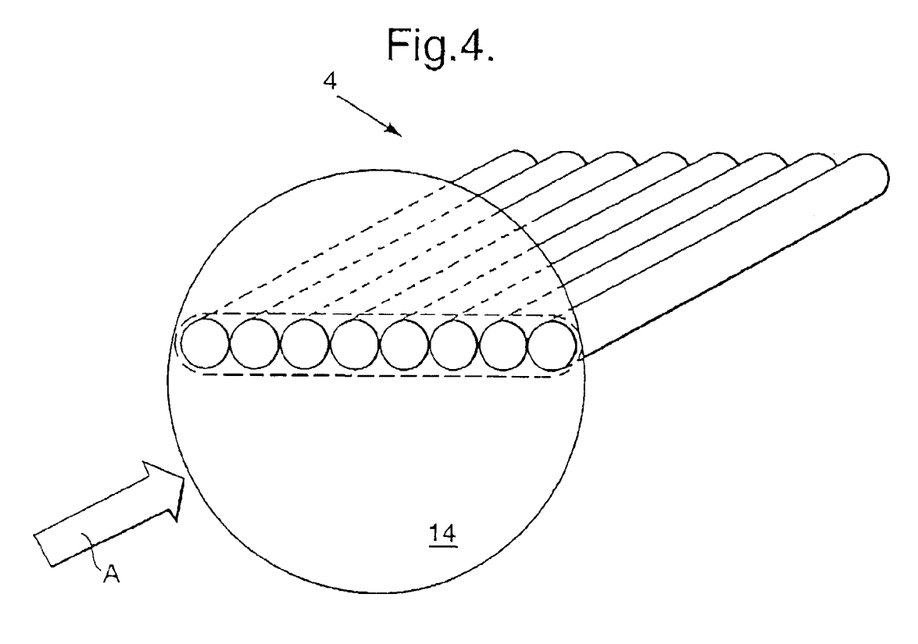
FIG. 4 shows a one-dimensional scanning configuration.

The two-dimensional scanning configuration of FIG. 4 shows a bundle 4 of, in this example, four fibers, the ends of which are located in ranging plane 14 and over which the image is scanned by any of the per se known two-dimensional scanners. In conformity with the above-given explanations concerning the time-delay principle, each one of the four fibers is of a different length. Arrow A indicates the light from the imaging means 2 (FIG. 1).

A one-dimensional scanning configuration is shown in FIG. 4. Here, bundle 4 (at its range plane end) is flat, and of a linear extent that covers the largest horizontal dimension of ranging plane 14, in this case, its diameter. In this embodiment, too, the fibers of flat bundle 4 are each of a different length. It will be appreciated that while the image-side end of bundle 4 must be flat, the rest of its length may assume any shape. The shape of the detector-side end will be discussed further below. The advantage of this configuration is the reduced complexity of the required scanning mechanism.

Figure 5:
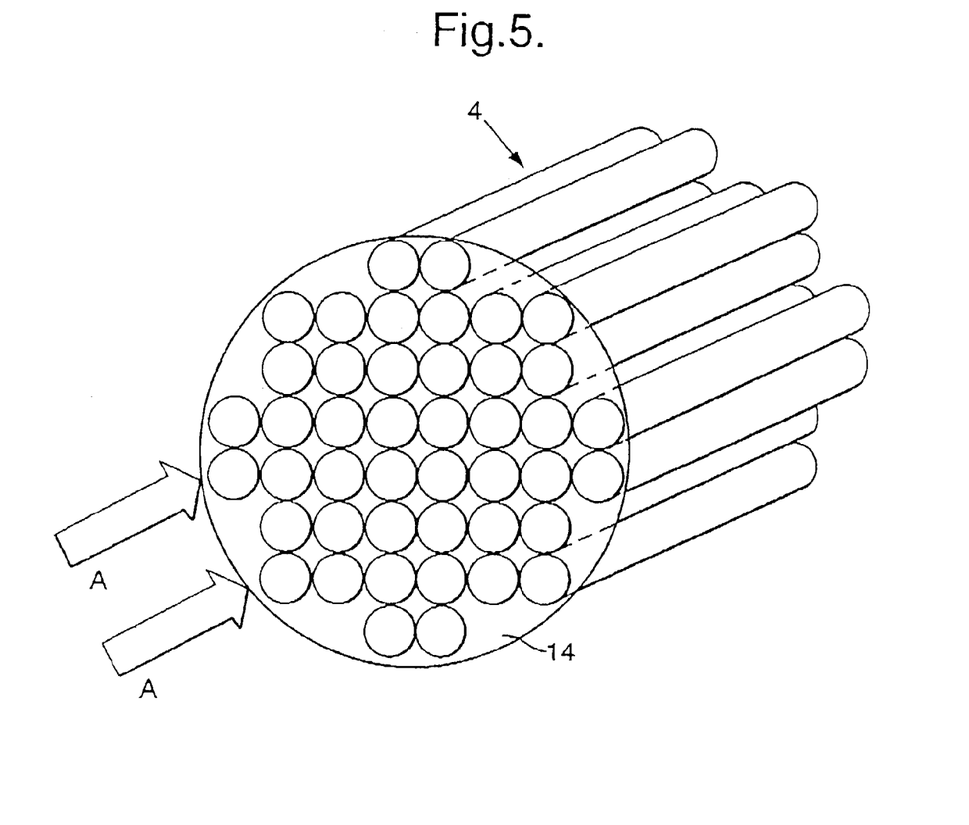
FIG. 5 shows a non-scanning, staring configuration.

FIG. 5 illustrates a non-scanning, so-called staring configuration, in which bundle 4 is of such a size as to fill the entire ranging plane 14. The fact that this configuration requires no scanning at all is a definite advantage. On the other hand, the total weight, length and bulkiness of such a bundle might present difficulties for some applications, for which possible solutions will be proposed further below.

An additional parameter influencing the fiber bundle configuration is the filling factor of the scene-to-fiber transfer. While it is most convenient to provide one fiber for each range pixel in ranging plane 14, the circular cross-section of commercially available fibers, when packed to form a bundle, produces blind spots between adjacent fibers. With fibers of a diameter of, e.g., 100 μm, the extent of these blind spots is liable to become significant, inasmuch as important information may be missed. In such cases, it is advantageous to use a number ($n^2$) of fibers of a small diameter (e.g., 10 μm), to jointly collect the range pixels previously collected by a single, 100 μm diameter fiber, resulting in a pronounced reduction of the blind spot areas. Depending on the fiber architecture selected (see below), the $n^2$ fibers may be directly coupled to detector/receiver 6, or may be merged into a single, larger fiber before reaching detector/receiver 6.

The term "fiber bundle architecture" refers, in general, to the way the light is conveyed from the ranging plane to the detector/receiver, using a bundle of fibers. In direct architecture, one end of each fiber is located in ranging plane 14, the other end being coupled to detector/receiver 6. This architecture is convenient when the number of pixels, multiplied by the diameter of the fiber, is close to the detector/receiver diameter, thus ensuring that most of the detector/receiver surface will be illuminated. As an example, when 10 fibers are needed, each of a diameter of 100 μm, and the detector/receiver diameter is 1.5 to 2 mm, the direct architecture will be a good choice.

The combined architecture is used when the number of needed fibers is large and/or when there are severe restrictions on the volume and weight of the detection system. It should be kept in mind that, due to the increasing length of the fibers (one with respect to the other) in the bundle, the total length and weight, in the direct architecture, may be too great. The combined architecture resolves this problem in a very elegant way the fibers used in ranging plane 14 are chosen to be of small diameter (for example, 10 μm). Some distance way from the ranging plane, the fibers are inserted into a main, thick fiber (in this example, 300 μm), each fiber at a different distance, to produce a different optical path for each fiber, as required by the invention. In such a configuration, the total fiber length is mainly the length of the main, thick fiber, which is much less than the total lengths of all the fibers used in the direct architecture. When necessary matching between the main fiber diameters and the detector diameter requires a thicker main fiber, several main fibers may be used, with only a part of the ranging-plane fibers entering each main fiber, or a thicker main fiber may be used. Schematically, this architecture is seen in FIG. 6, showing ranging plane 14, detector/receiver 6, main fiber 18 and thin ranging-plane fibers 1, 1', 1" to 1'''.

Figure 6:
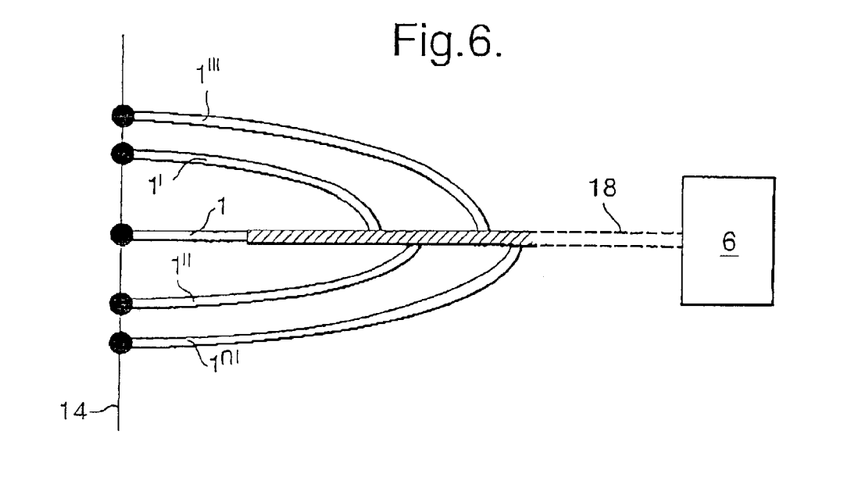
FIG. 6 depicts an example of a combined fiber architecture.
Figure 7:
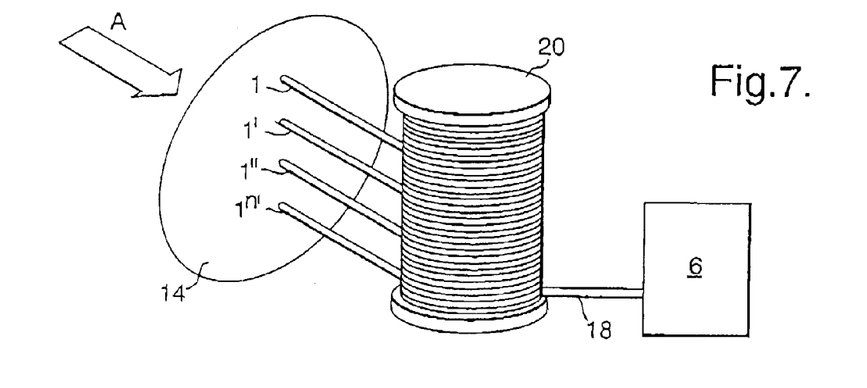
FIG. 7 illustrates a practical, compact version of the architecture of FIG. 6.

FIG. 7 shows a practical, compact version of the architecture of FIG. 6, showing a coil 20 on which main fiber 18 is wound, as well as parts of the thin, ranging-plane fibers 1 to 1'''.

Figure 8:
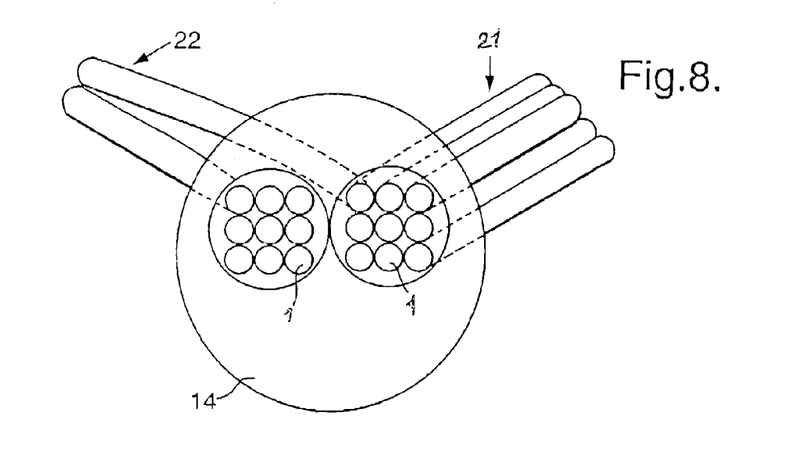
FIG. 8 shows the use of a sub-bundle of fibers.

The former architecture may present difficulties when the ranging plane thin fibers are of extremely small diameters (e.g., 10 μm). This is so because of the severe mechanical adjustment needed between the exact fiber position and the ranging pixel position. As illustrated in FIG. 8, the solution to this problem is found in the previously mentioned replacement of each ranging plane fiber by m×m thin fibers 1 to 1''' packed in sub-bundles 21, each sub-bundle replacing a single fiber 1 to 1'''. If, for example, 3×3=9, 10 μm replacement fibers are used, the focal length of the ranging means is changed to such an extent that the ranging pixel is enlarged to fit a sub-bundle diameter of 3×10=30 μm. These fibers are commercial, and the problem of mechanical tolerance is eliminated. Furthermore, the m×m thin fiber model offers additional advantages and can be used to resolve additional problems and fulfill other functions. One of the m×m fibers can be used to measure properties other than the properties in the fibers of sub-bundle 21, e.g., true ranging polarization and the like.

This modification of the fiber architecture, namely, the reference probe, can be used to solve additional problems in the multi-pixel ranging. It is accomplished by splitting out one fiber 1 from each m×m fiber sub-bundle 21, forming a parallel bundle 22 of non-delaying equal length fibers and coupling it to an additional detector (not shown), designed to measure the other specific light echo properties.

Thus, if sub-bundles 21 are used to measure the distances to the target pixels using the delay solution according to the present invention, bundle 22 may be used to measure the genuine, undelayed ranges, thus enabling the system to distinguish between proper target induced light echoes and ghost echoes that are caused by the presence of irrelevant, additional obstacles positioned in front of the main target (i.e., birds, poles). The signal addressing logic 8, when given pixel-related delayed ranges, together with correct non-pixel-related delayed ranges can calculate correct pixel-related ranges. Such additional information, when correctly used, will prevent the inclusion of these obstacles in the final target ranging, thus reducing system false alarms. This additional information will enable the logic unit to determine the correct range pixel identification of light echoes when the scene depth, i.e., the range difference between the nearest and furthest object in the scene is similar to the system-induced delays.

Figure 9:
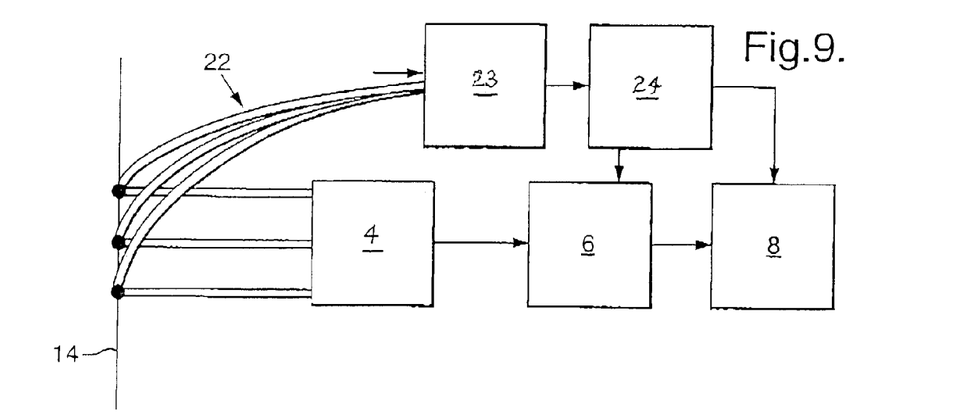
FIG. 9 illustrates the use of a sub-bundle of fibers for use with a light-intensity detector/receiver.

Another use of the additional sub-bundle illustrated in FIG. 9 is when it is connected to a light-intensity measuring detector 23. This application uses a bundle 22 as a reference probe to prevent the main detector electronics and logic 8 from being blinded by high-intensity light echoes. The signal from the undelayed bundle 22 arrives at its detector 23 early enough to let main detector electronics 8, by means of control circuit 24, to reduce its amplification (voltages) automatically to the required value.

In principle, the fiber-to-detector coupling should not pose any difficulty, being a conventional coupling that transfers light energy to standard detectors. In spite of this, the fact should be kept in mind that various fiber architectures may require different couplings.

Figure 10:
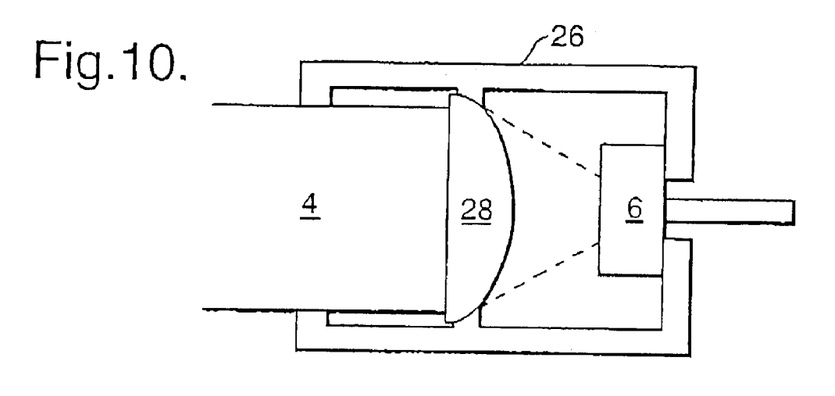
FIG. 10 illustrates the use of a mediator arrangement.

When the direct configuration is used, depending on the number of fibers in the bundle, the total diameter of bundle 4 may be smaller or larger than the detector/receiver diameter. For example, a total number of 20 fibers, each of a diameter of 30 μm, results in a bundle diameter of 600 μm=0.6 mm. A diode of an effective diameter of 2 mm may accept such a bundle directly, without the need for a mediator. When, on the other hand, the fibers are of diameters of 200 μm each, the total bundle diameter will be 4 mm, a value which exceeds the effective diameter of the detector. This requires the use of a mediator, such as that shown in FIG. 10, comprising a mounting 26 accommodating the end of bundle 4, as well as a short focal length lens 28 that concentrates the light from bundle 4 onto detector/receiver 6.

Figure 11:
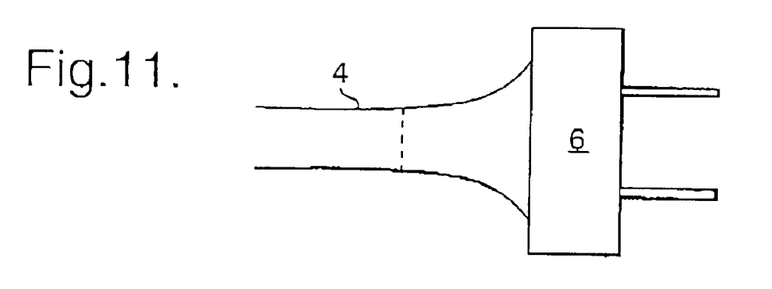
FIG. 11 shows a first method of coupling a relatively narrow fiber to a much larger detector/receiver.
Figure 12:
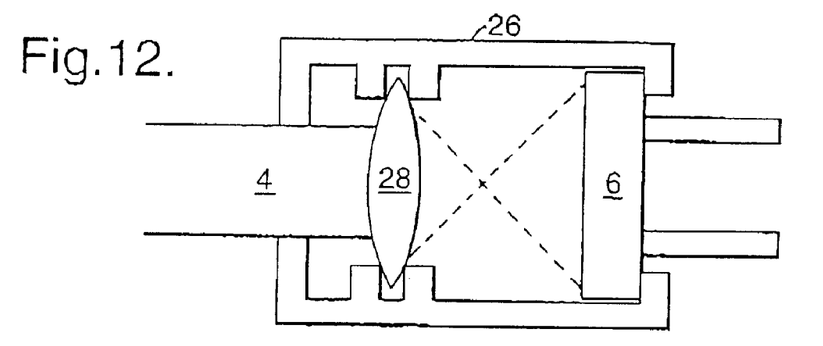
FIG. 12 illustrates a mediator arrangement for the same purpose as shown in FIG. 11.

The above-mentioned combined fiber architecture ends in the shape of a single main fiber, of a diameter that may be from 100–500 μm. When detector/receiver 6 is of a diameter of 0.1–1 mm, it can accept the fiber as is. But in the extreme case of a thin fiber (100 μm) and a large-aperture detector (2–4 mm), in spite of the fact that the direct approach may be adequate, it is advised that the light be diffused over the entire detector aperture, in order not to be dependent on the detector surface homogeneity. In this case, a main fiber may be used that flares at its end to match the detector diameter, as seen in FIG. 11. Alternatively, a mediating lens 28 may be used in an arrangement similar to that of FIG. 10 (see also FIG. 12).

Figure 13:
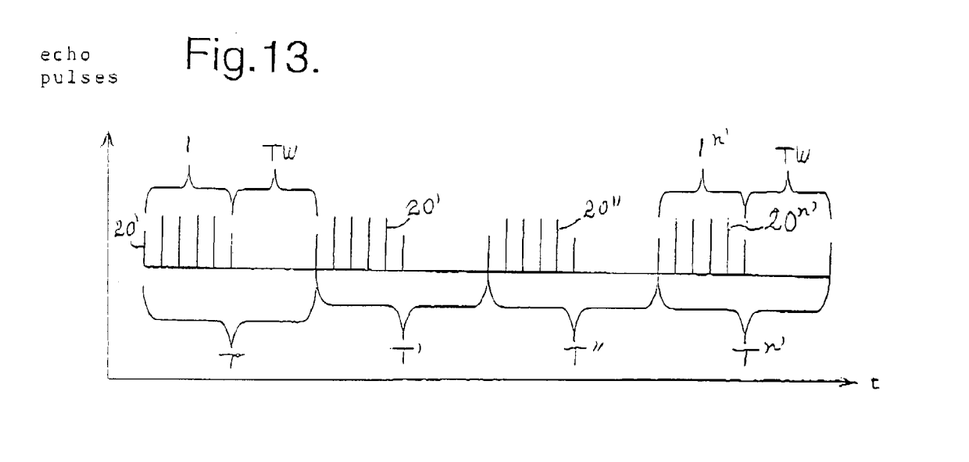
FIG. 13 is a graphic representation of the "time windows" between two adjacent fibers according to the present invention.

In accordance with the present invention as graphically illustrated in FIG. 13, there are provided a plurality of fibers 1, 1', 1''. . . 1''' of different lengths introducing different time delays. The length of the fibers are calculated such that in between two adjacent fibers there will be provided a time window TW free of echo pulses 20, 20', 20''. . . 20'''. The delay between one fiber and another is set to be greater e.g., double, than the depth of the ranged scene. If, e.g., the depth of the scene is 20 m, then instead of the commonly given distance of time or arrival of e.g., 26 m, there will be provided a distance of a time of arrival of 52 m. Hence the time distance between two adjacent fibers is T, T', T''. . . T'''. With this solution, the system will be able to easily identify the belonging of an echo pulse to the relevant fiber. Furthermore, the system will be able to distinguish between the first and last echo pulse and even identify a plurality of targets for each fiber and the distance to the target of each echo pulse.

This solution provides an answer to the problem of the detector/receiver's recovery time. This is so, since the last strongest echo pulse of a certain fiber will be distant in time, at least with respect to the time of the depth of the scene, from the next first fiber, so that even if the echo pulse will be of the weakest nature, the detector/receiver will have sufficient time to recover from the last strongest echo pulse. The exact manner in which the system operates in such a situation is such that the system will determine the difference between a certain echo pulses to the next one. If the difference will be smaller than the depth of the scene, then it will belong to the same fiber, while if the difference is greater than the depth of the scene, it belongs to the next fiber.

In addition, such a solution also provides an answer to a situation of lack of an echo pulse in a certain fiber. Due to the fact that there exist relatively long time windows, the lack of an echo pulse in a certain fiber will be identified by the system and it will not be necessary to disregard all the other measurements of distance which were received in other fibers, as is the case in other systems. The identification of such a situation by the system will be carried out by calculating the time gap between two consecutive echo pulses. If such a gap is greater than three times the time of the depth of the scene, then there is a miss of a fiber and the returning echo pulse belongs to the next one.

A possible disadvantage of such a system is the reliance on the echo pulses from the first fiber. In the event that there will not be received an echo pulse from the first fiber, the system may err in calculating the other distances. To this problem, however, there also exists a solution. First of all the first fiber can be disposed in the center of the bunch of fibers and not at its end, in order to reduce the danger of the echo pulse not being received. In addition, the system knows how to identify the echo pulses with specific fibers, so that in these cases wherein an echo pulse will not be received from the first fiber, the system, e.g., a 14 fiber system, will count altogether 13 echo pulses (or a group of 13 echo pulses) instead of 14, and will identify the fact that there is missing an echo pulse or that the echo pulses emanates from the first fiber or from the last one. A solution for a missing echo pulse of other fibers was already described hereinabove. The above problem can also be overcome by checking the distance, i.e., the time delay, which has been obtained from the first fiber with respect to the instant transmission, as compared with the measured distance or time delay of the previous transmission or transmissions. In the event that the difference between the distances is greater than the depth of the scene, it can be concluded that there is no echo pulse from the first fiber. If the difference is smaller than the depth of the scene, then it can be concluded that no echo pulse was received from the last fiber, in case the system has e.g., identified 13 out of 14 echo pulses only. In such a manner, even if there has not been received an echo pulse from the first fiber, the system will not spoil the measured distances of the other fibers. It is also possible to have the system provide an alert when an error is detected, or perform a calculation of the missing distance on the basis of the previous transmissions.

When the system is adapted to handle a plurality of distances and to perform analysis of the difference between two adjacent echo pulses, as well as an analysis of the difference between distances of a previous transmissions, the system will be able to clear or eliminate all signals obtained in the system which do not conform to required criteria, e.g., above or below a certain value, namely, an echo pulse which is further away from the group of e.g., 14 measured echo pulses. Such an echo pulse will be regarded as a false alarm and the system will disregard it. In this manner, the system improves the false alarm feature in a digital manner and all the echo pulses which are outside the time window of the scanned scene will be automatically cleared.

The idea of multiplying the distance between fibers does, in fact, multiply the overall length of the fibers, however, provides a perfect answer to the problem of the multiplicity of distances and lack of an echo pulse received in a certain fiber. Also, since for may applications it is possible to deal with scenes of about 20 m and not 75 m, values of weight and length of fibers will remain the same.

Figure 14:
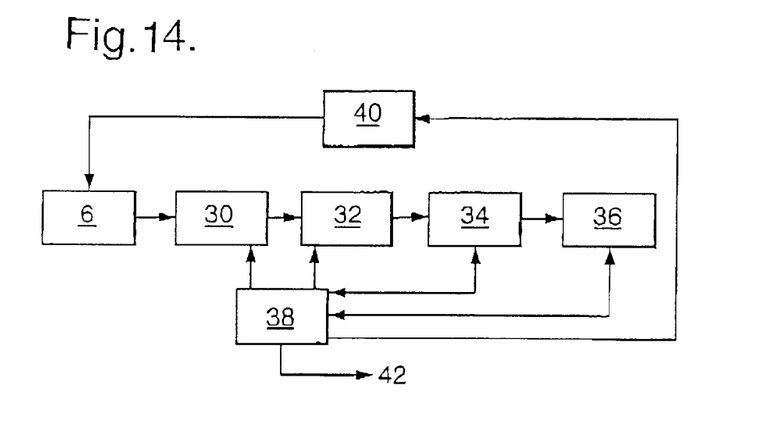
FIG. 14 is a detailed block diagram of an embodiment of the electronics associated with the single detector/receiver of the system according to the present invention.

By way of example, FIG. 14 represents a detailed block diagram of the electronics associated with the single detector/receiver 6 coupled to fiber bundle 4 in an arrangement used to produce range measurements. Seen are detector/receiver 6, feeding a preamplifier 30, a TPG amplifier 32, an A/D converter 34 leading to a memory 36, and decoding and processing unit 38. The unit 38 is operationally interconnected with the preamplifier 30, the amplifier 32, the A/D converter 34 and the memory 36. Advantageously, there is also provided a voltage control unit 40, and an output at 42.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for non-scanning multi-pixel ranging of a scene, comprising the steps of:
    providing a single detector/receiver associated with a time-delay arrangement;
    producing a time-arrival distribution of pulse echoes of at least part of a remote scene in a defined ranging plane;
    receiving said distribution as produced on said ranging plane and conveying it, echo pulse by echo pulse through a plurality of echo pulse conveying means to said single detector/receiver, while introducing a time delay, whereby said echo pulses arrive at said single detector/receiver in a sequential order;
    calculating the time delay between two consecutive echo pulses to determine whether the time delay is greater than at least one time of the depth of the scene, in order to establish arrival of all echo pulses from the scene, and
    using an electronic logic to reconstruct said time-arrival distribution from said time-delayed echo pulses received by said detector/receiver.

2. The method as claimed in claim 1, wherein said echo pulses conveying means is a bundle of optical fibers and further comprising the step of providing each of said echo pulses-conveying means with a different length, thereby producing said time-delay.

3. A method for multi-pixel ranging of a scene, comprising the steps of:
    providing a single detector/receiver associated with a time-delay arrangement;
    producing a delayed time-arrival distribution of pulse echoes of at least part of a remote scene of a predetermined depth spanning between a closest point and a furthest point from said detector/receiver;
    receiving said distribution as produced on said ranging plane and conveying it, echo pulse by echo pulse through a plurality of time-ordered echo pulse conveying means to a single detector, while introducing an additional time delay between said conveying means, which is equal to, or greater than, the time delay between said closest and furthest points of the scene, whereby said echo pulses arrive at said single detector/receiver in a sequential order;
    calculating the time delay between two consecutive echo pulses to determine whether the time delay is greater than at least one time of the depth of the scene, in order to establish arrival of all echo pulses from the scene, and
    using an electronic logic to reconstruct said time-arrival distribution from said time-delayed echo pulses received by said detector/receiver.

4. The method as claimed in claim 3, wherein said echo pulses conveying means is a bundle of optical fibers of different lengths, thereby producing said time-delay.

5. A method for non-scanning multi-pixel ranging of a scene, comprising the steps of:
    providing a single detector/receiver associated with a time-delay arrangement;
    producing a time-arrival distribution of pulse echoes of at least part of a remote scene in a defined ranging plane;
    receiving said distribution as produced on said ranging plane and conveying it, echo pulse by echo pulse through a plurality of echo pulse conveying means to said single detector/receiver, while introducing a time delay, whereby said echo pulses arrive at said single detector/receiver in a sequential order,
    using an electronic logic to reconstruct said time-arrival distribution from said time-delayed echo pulses received by said detector/receiver, and
    further comprising the step of calculating the time delay between two consecutive echo pulses and eliminating pulses arriving at the detector/receiver between said consecutive pulses.

6. A method for non-scanning multi-pixel ranging of a scene, comprising the steps of:
providing a single detector/receiver associated with a time-delay arrangement;
producing a time-arrival distribution of pulse echoes of at least part of a remote scene in a defined ranging plane;
receiving said distribution as produced on said ranging plane and conveying it, echo pulse by echo pulse through a plurality of echo pulse conveying means to said single detector/receiver, while introducing a time delay, whereby said echo pulses arrive at said single detector/receiver in a sequential order,
using an electronic logic to reconstruct said time-arrival distribution from said time-delayed echo pulses received by said detector/receiver, and
further comprising the step of comparing a measurement of the time delay received in a first conveying means with the time delay received in said first conveying means of at least one previous measurement, in order to establish receipt of an echo pulse from said first conveying means.

7. A system for ranging of a scene, comprising:
optical means to create a replicate of a remote scene range distribution on a defined ranging plane;
time-ordered echo pulses conveying means receiving said echo pulses from said ranging plane, each of said conveying means constituting an optical path of different length, introducing time delays;
a single detector/receiver for detecting the echo pulses time of arrival in a sequential order produced by said time delays,
an electronic logic fed by said single detector to reconstruct said scene by the ranged distribution of echo pulses, and
means for calculating the time delay between two consecutive echo pulses to determine whether the time delay is greater than at least one time of the depth of the scene, in order to establish arrival of all echo pulses from the scene.

8. The system as claimed in claim 7, wherein said single detector is an avalanche photo diode.

9. The system as claimed in claim 7, wherein said echo pulses conveying means is a bundle of optical fibers leading from said ranging plane to said single detector/receiver.

10. The system as claimed in claim 9, wherein the ranging plane and portion of said fiber bundle consist of a single, substantially linear array of fibers.

11. The system as claimed in claim 7, wherein said echo pulses conveying means is a bundle of optical fibers of different lengths.

12. The system as claimed in claim 11, wherein said bundle of optical fibers is of a configuration requiring two-dimensional scanning.

13. The system as claimed in claim 11, wherein said bundle of optical fibers is of a configuration requiring one-dimensional scanning.

14. The system as claimed in claim 11, wherein said bundle of optical fibers is of the staring, non-scanning type.

15. The system as claimed in claim 11, further comprising a sub-bundle of optical fibers for detecting objects located between the scene to be ranged and said ranging plane.

16. The system as claimed in claim 7, further comprising an echo pulse intensity measuring and controlling unit interposed in circuit between the ranging plane and said detector/receiver for preventing saturation of said detector/receiver by high intensity echo pulses.

17. The system as claimed in claim 16, wherein said measuring and controlling unit is fed by a non-time-delaying secondary function bunch of fibers.

18. The system as claimed in claim 17, wherein said detector/receiver is defined by a light-detecting aperture and said system further comprises a light diffuser affixed between at least some of the optical fibers and said detector/receiver for diffusing echo pulses over substantially the entire detector aperture.

19. The system as claimed in claim 18, wherein said light diffuser is an optical fiber section flaring at its end to substantially match the detector/receiver's aperture.

20. The system as claimed in claim 18, wherein said light diffuser is a mediating lens.

21. A system for ranging of a scene, comprising:
optical means to create a replicate of a remote scene range distribution on a defined ranging plane;
time-ordered echo pulses conveying means receiving said echo pulses from said ranging plane, each of said conveying means constituting an optical path of different length, introducing time delays;
a single detector/receiver for detecting the echo pulses time of arrival in a sequential order produced by said time delays,
an electronic logic fed by said single detector to reconstruct said scene by the ranged distribution of echo pulses, and
means for calculating the time delay between two consecutive echo pulses to determine whether the time delay is greater than at least one time of the depth of the scene, in order to establish arrival of all echo pulses from the scene,
said echo pulses conveying means is a bundle of optical fibers leading from said ranging plane to said single detector/receiver,
said bundle of optical fibers is constituted by a length of a main fiber of an enlarged diameter and a plurality of smaller diameter fibers commencing from said ranging plane and entering said main fiber along its length.

22. A system for ranging of a scene, comprising:
optical means for forming a replicate of a remote scene, having a predetermined depth spanning between a closest point and furthest point of said scene, on a defined ranging plane;
time-ordered echo pulses conveying means receiving said echo pulses from said ranging plane, each of said conveying means constituting an optical path of different length, for introducing a time delay between two adjacent conveying means which is equal to, or greater than, the time delay between the closest and furthest point of said scene;
a singe detector/receiver for detecting the echo pulses time of arrival in a sequential order produced by said time delays,
calculating the time delay between two consecutive echo pulses to determine whether the time delay is greater than at least one time of the depth of the scene, in order to establish arrival of all echo pulses from the scene, and
an electronic logic fed by said single detector/receiver to reconstruct said scene by the ranged distribution of echo pulses.

23. The system as claimed in claim 22, wherein said echo pulses conveying means is a bundle of optical fibers leading from said ranging plane to said single detector/receiver.

24. The system as claimed in claim 22, wherein said echo pulses conveying means is a bundle of optical fibers of different lengths.

25. The system as claimed in claim 22, wherein the detector of said single detector/receiver is an avalanche photo diode.

26. The system as claimed in claim 22, wherein the ranging plane and portion of said fiber bundle consist of a single, substantially linear may of fibers.

27. The system as claimed in claim 22, further comprising an echo pulse intensity measuring and controlling unit interposed in circuit between the ranging plane and said detector/receiver for preventing saturation of said detector by high intensity echo pulses.

28. A method for multi-pixel ranging of a scene, comprising the steps of:
 providing a single detector/receiver associated with a time-delay arrangement;
 producing a delayed time-arrival distribution of pulse echoes of at least part of a remote scene of a predetermined depth spanning between a closest point and a furthest point from said detector/receiver;
 receiving said distribution as produced on said ranging plane and conveying it, echo pulse by echo pulse through a plurality of time-ordered echo pulse conveying means to a single detector, while introducing an additional time delay between said conveying means, which is equal to, or greater than, the time delay between said closest and furthest points of the scene, whereby said echo pulses arrive at said single detector/receiver in a sequential order;
 using an electronic logic to reconstruct said time-arrival distribution from said time-delayed echo pulses received by said detector/receiver, and
 calculating the time delay between two consecutive echo pulses and eliminating pulses arriving at the detector/receiver between said consecutive pulses.

29. A method for multi-pixel ranging of a scene, comprising the steps of:
 providing a single detector/receiver associated with a time-delay arrangement;
 producing a delayed time-arrival distribution of pulse echoes of at least part of a remote scene of a predetermined depth spanning between a closest point and a furthest point from said detector/receiver;
 receiving said distribution as produced on said ranging plane and conveying it, echo pulse by echo pulse through a plurality of time-ordered echo pulse conveying means to a single detector, while introducing an additional time delay between said conveying means, which is equal to, or greater than, the time delay between said closest and furthest points of the scene, whereby said echo pulses arrive at said single detector/receiver in a sequential order;
 using an electronic logic to reconstruct said time-arrival distribution from said time-delayed echo pulses received by said detector/receiver, and
 comparing a measurement of the time delay received in a first conveying means with the time delay received in said first conveying means of at least one previous measurement, in order to establish receipt of an echo pulse from said first conveying means.

* * * * *